(12) United States Patent
Janky et al.

(10) Patent No.: US 8,169,983 B2
(45) Date of Patent: May 1, 2012

(54) TRANSCODER ARCHITECTURE FOR LAND MOBILE RADIO SYSTEMS

(75) Inventors: William Oscar Janky, Goode, VA (US); Thomas Andrew Hengeveld, Hollis, NH (US); Dennis Michael Martinez, Westford, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 966 days.

(21) Appl. No.: 11/501,132

(22) Filed: Aug. 7, 2006

(65) Prior Publication Data

US 2008/0031275 A1 Feb. 7, 2008

(51) Int. Cl.
*H04W 4/00* (2009.01)

(52) U.S. Cl. ........ 370/338; 455/466; 455/519; 455/521; 455/552.1

(58) Field of Classification Search ........................ None
See application file for complete search history.

(56) References Cited

U.S. PATENT DOCUMENTS

| | | | |
|---|---|---|---|
| 4,845,504 A | 7/1989 | Roberts et al. | |
| 5,436,900 A * | 7/1995 | Hammar et al. | 370/336 |
| 5,818,824 A * | 10/1998 | Lu et al. | 370/328 |
| 5,862,486 A | 1/1999 | Przelomiec | |
| 5,933,784 A * | 8/1999 | Gallagher et al. | 455/552.1 |
| 5,995,923 A * | 11/1999 | Mermelstein et al. | 704/219 |
| 6,009,553 A | 12/1999 | Martinez et al. | |
| 6,035,196 A | 3/2000 | Hengeveld et al. | |
| 6,049,543 A * | 4/2000 | Sauer et al. | 370/335 |
| 6,253,082 B1 | 6/2001 | Hengeveld | |
| 6,515,997 B1 | 2/2003 | Feltner et al. | |
| 6,549,587 B1 | 4/2003 | Li | |
| 6,603,774 B1 | 8/2003 | Knappe et al. | |
| 6,678,654 B2 * | 1/2004 | Zinser et al. | 704/221 |
| 6,775,337 B2 | 8/2004 | Janky et al. | |
| 7,328,042 B2 * | 2/2008 | Choksi | 455/552.1 |
| 7,590,143 B2 * | 9/2009 | Daley et al. | 370/466 |
| 2001/0046214 A1 | 11/2001 | Kang | |
| 2002/0093928 A1 | 7/2002 | LoGalbo et al. | |

(Continued)

FOREIGN PATENT DOCUMENTS

EP 0 848 565 A2 6/1998

(Continued)

OTHER PUBLICATIONS

Nieminen T et al: "A Gateway Between an Eurocom D/1-Network and a Private PPT-Type CCITT SS7-Network" Military Communications Conference, 1992. MILCOM '92, Conference Record. Communications—Fusing Command, Control and Intelligence., IEEE San Diego, CA USA Oct. 11-14, 1992, New York, NY USA, IEEE, US, Oct. 11, 1992, pp. 149-153, XP010060964.

(Continued)

*Primary Examiner* — Willie J Daniel, Jr.

(74) *Attorney, Agent, or Firm* — Fox Rothschild, LLP; Robert J. Sacco (57) ABSTRACT

A transcoder architecture and method for transcoding in land mobile radio (LMR) systems are provided. The LMR system includes a first communication site configured to communicate using a first LMR communication protocol and a second communication site configured to communicate using a second LMR communication protocol. The LMR system further includes a transcoder configured to receive LMR content from the first communication site communicated using the first LMR communication protocol and digitally convert the LMR content to the second LMR communication protocol to be communicated to the second communication site.

21 Claims, 4 Drawing Sheets

U.S. PATENT DOCUMENTS

| | | |
|---|---|---|
| 2002/0151321 A1 | 10/2002 | Winchell et al. |
| 2003/0013465 A1 | 1/2003 | Choong et al. |
| 2003/0053434 A1 | 3/2003 | Chow et al. |
| 2003/0058827 A1 | 3/2003 | Chow et al. |
| 2003/0119498 A1 | 6/2003 | Haas et al. |
| 2003/0193934 A1* | 10/2003 | Dropmann et al. ........... 370/355 |
| 2004/0121729 A1 | 6/2004 | Herndon et al. |
| 2006/0058007 A1 | 3/2006 | Choksi |
| 2006/0120350 A1 | 6/2006 | Olds et al. |

FOREIGN PATENT DOCUMENTS

| | | |
|---|---|---|
| WO | WO 97/36445 | 10/1997 |
| WO | WO 02/28131 A1 | 4/2002 |
| WO | WO-02 080147 A1 | 10/2002 |
| WO | WO 02/084913 A1 | 10/2002 |
| WO | WO 03/015431 A1 | 2/2003 |

OTHER PUBLICATIONS

International Search Report, International application No. PCT/US2007/017457, International filing date Jun. 8, 2007.

Lee, David J. Y., "Tunneling Wireless Voice With Software Defined Vocoder", Institute of Electrical and Electronics Engineers, VTC Spring 2002. IEEE 55th. Vehicular Technology Conference, Proceedings. Birmingham, AL May 6-9, 2002, pp. 1623-1625, XP010622089.

European Search Report mailed Sep. 7, 2010, Application Serial No. 10007098.6-2412, Applicant: Pine Valley Investments, Inc.

* cited by examiner

TRANSCODER ARCHITECTURE FOR LAND MOBILE RADIO SYSTEMS

BACKGROUND OF THE INVENTION

This invention relates generally to land mobile radios, and more particularly, to a device providing communication between different land mobile radio systems.

Land mobile radios (LMRs) may be used to provide communication between different mobile units. Land mobile radio communication, for example, public safety radio communication (e.g., police, fire department, etc.) is generally available within the VHF, UHF, 700 MHz and 800 MHz frequency bands. Part of each of these frequency bands is allocated by the Federal Communications Commission (FCC) for public safety communication services and are also referred to as Public Safety Frequency Bands. These communications also may be provided using private land mobile radio services (PLMRS).

When LMRs are used, for example, to provide emergency communications, interoperability between different systems (e.g., fire department LMR system and police department LMR system, or different fire department LMR systems) is important. However, each of the different systems may have different communication requirements based on, for example, the manufacturer of the LMR or LMR system and/or the air interface protocol implemented on the system (e.g., trunked or conventional, M/A-COM or Motorola, P25, Enhanced Digital Access Communications System (EDACS), OPENSKY® or Terrestrial Trunked Mobile Radio (TETRA)). Each of these different systems typically include a specific voice encoder (vocoder) and have different encryption schemes. For example, a P25 system typically uses an Improved Multi-Band Excitation (IMBE) vocoder with Data Encryption Standard (DES) or Advanced Encryption Standard (AES) encryption while an OPENSKY® system typically uses an Advanced Multi-Band Excitation (AMBE®) vocoder with AES encryption. Thus, when attempting to communicate between different LMR systems, not only is interoperability an issue, including end-to-end security and encryption, but also minimizing voice quality degradation.

Known systems use analog voice communication as the interface between two disparate LMR systems. Accordingly, a digital audio source from one system is decrypted and de-vocoded. The resulting analog audio is then re-vocoded and re-encrypted for transmission to the other LMR system. Further, end-to-end encryption is only implemented between devices using the same vocoder, encryption algorithm and encryption key. Additionally, in some wide-area digital LMR systems such as state-wide systems, for efficiency of RF coverage, different system types may be used in different parts of the communication coverage area where users may roam. These systems are sometime referred to as hybrid systems. In such systems, different users within the same organization may use different types of communication protocols with different vocoders and encryption algorithms. Accordingly, depending on the area in which a user is communicating, the same radio may be forced to switch between different system types. Therefore, interoperability may be needed not only between systems using different communication protocols and operated by different entities, but within a single system wherein different communication protocols are used.

Thus, these known systems add significant complexity in system design and control, thereby adding cost. There is also the potential for significant audio quality degradation between the two systems. Further, the intercommunication is typically limited in flexibility and often includes at some point in the communication link a clear unencrypted voice audio transmission. This unencrypted transmission between the two LMR systems results in a less secure communication connection.

BRIEF DESCRIPTION OF THE INVENTION

In one exemplary embodiment, a land mobile radio (LMR) system is provided that includes a first communication site configured to communicate using a first LMR communication protocol and a second communication site configured to communicate using a second LMR communication protocol. The LMR system further includes a transcoder configured to receive LMR content from the first communication site communicated using the first LMR communication protocol and digitally convert the LMR content to the second LMR communication protocol to be communicated to the second communication site.

In another exemplary embodiment, a land mobile radio (LMR) system is provided that includes a plurality of LMR units with at least two of the plurality of LMR units having different voice encoders. The LMR system further includes a transcoder configured to digitally convert LMR content communicated between the LMR units having different voice encoders.

In yet another exemplary embodiment, a method for communicating content in a land mobile radio (LMR) system is provided. The method includes receiving LMR content to be converted from a first vocoder type to a second vocoder type and converting digitally the LMR content from the first vocoder type to the second vocoder type.

DETAILED DESCRIPTION OF THE INVENTION

Various embodiments of the invention include a system for communicating between different LMR networks or systems without using analog baseband as an intermediate step. Intersystem or internetwork communication is provided by transcoding the LMR content transmitted between LMR systems or networks.

It should be noted that when reference is made herein to LMR content, this refers generally to any type or kind of LMR voice and/or data content, and may define particular LMR services, operations, controls, etc. For example, the LMR content may include, but is not limited to, encrypted or unencrypted voice data, emergency signal data, control data relating to selecting a particular talk group, LMR data for transfer between a radio unit and a server, reprogramming data (e.g., software upgrade data), etc.

A wireless communication system will first be described followed by a description of a transcoding/transcrypting architecture and method provided in accordance with various embodiments of the invention.

Figure 1:
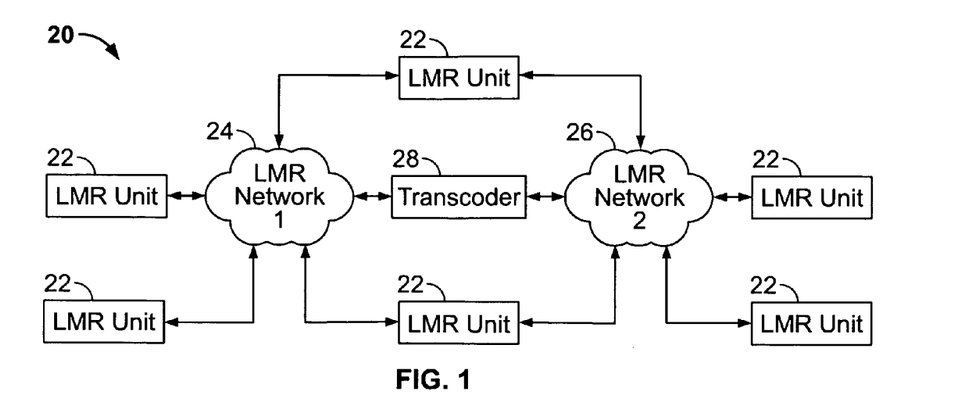
FIG. 1 is a block diagram of an exemplary embodiment of a land mobile radio (LMR) communication system.

As shown in FIG. 1, a wireless communication system, and more particularly, an LMR communication system 20 in connection within which various embodiments of the invention may be implemented to provide communication between a plurality of LMR units 22 or LMR terminals. Each of the LMR units 22 may communicate using different protocol standards and/or with different vocoders. Communication between the LMR units 22 may be provided via one or more different LMR networks, for example, a first LMR network 24 (LMR Network 1) and a second LMR network 26 (LMR Network 2). For example, the first LMR network 24 may be configured to provide communication using an APCO Project 25 standard/protocol and the second LMR network 26 may be configured to provide communication using a TETRA standard/protocol. Thus, the LMR units 22 may include one or more vocoders depending on the whether the LMR unit communicates in the first LMR network 24, the second LMR network 26 or both. Is should be noted that the LMR unit 22 may be a mobile unit, for example, a mobile radio, or may be a fixed unit, for example, a dispatch console.

Further, various embodiments provide a transcoder 28 between one or more LMR networks or systems. For example, the transcoder may provide transcoding between the first LMR network 24 and the second LMR network 26 as described in more detail below. More particularly, the transcoder 28 may be an Internet Protocol (IP)-based network device that implements a transcoding algorithm or process to convert between different communication standards/protocols, for example, to convert data communicated between different vocoder types. The transcoder 28 optionally may perform additional functions, such as, encryption conversion and transcryption. In such an embodiment, the transcoder 28 is configured as a transcoder/transcryptor network device and may be implemented in connection with an IP voice switch 40 (shown in FIGS. 2 through 4) to provide communication between LMR units 22 operating on different LMR system types, for example, configured to communicate using different LMR systems, such as the first LMR network 24 and the second LMR network 26.

It should be noted that that the transcoder 28 may be protected within a facility, for example, locked within a secure room having limited and/or restricted access. For example, the transcoder 28 may be provided at a dispatch center or network operations center. Additionally, the transcoder 28 may be configured or programmed to perform functions or operations for specific groups or users that may be identified by unique user unit or user numbers. Accordingly, in an exemplary embodiment, different entities (e.g., different organizations) may provide a separate secure transcoder 28 to maintain end-to-end security for users of the LMR network for that entity.

Figure 2:
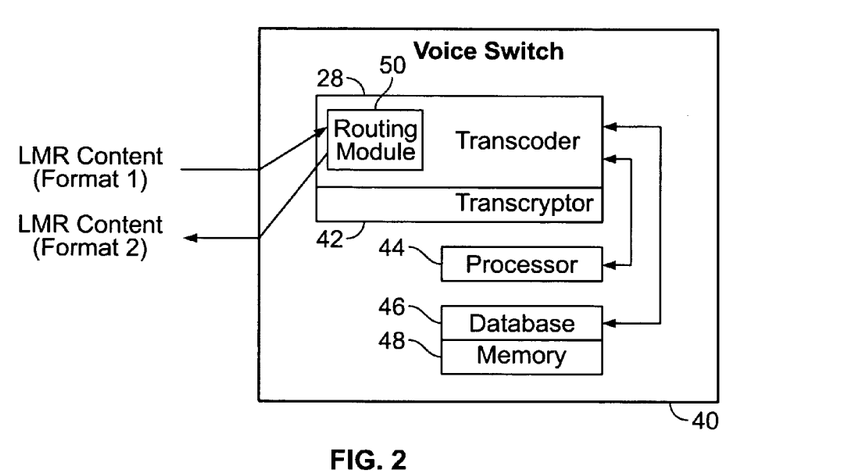
FIG. 2 is a block diagram of a voice switch with a transcoder constructed in accordance with an exemplary embodiment of the invention.

In the various embodiments, the transcoder 28 may be provided in connection with a voice switch, for example, the IP voice switch 40 shown in FIG. 2. However, it should be noted that the transcoder 28 may be provided separate from the IP voice switch 40, for example, as a separate unit. Further, the transcoder 28 may include a transcryptor 42, for example, integrated therewith. However, the transcryptor 42 may be provided separate from the transcoder 28, for example, as a separate unit. The IP voice switch 40 also may include a processor 44 and a database 46 that may be stored within a memory 48. The processor 44 and database 46 and/or memory 48 are connected to the transcoder 28. Additionally, a routing module 50 may be provided and integrated with the transcoder 50. The routing module 50 includes at least one input and at least one output for receiving LMR content from one system in one format and transmitting transcoded LMR content to a second system, respectively.

In operation, the transcoder 28 receives LMR content (e.g., accepts calls) in a first format from a first LMR network, for example, the first LMR network 24 (shown in FIG. 1) and transmits the LMR content (e.g., places calls) in a second format to a second LMR network, for example, the second LMR network 26 (shown in FIG. 1). In the various embodiments, the transcoder 28 transmits transcoded voice packet to a final destination, for example, to a base station within the second LMR network 26. Information regarding the format, network requirements, encoding, encryption, etc. for each of the different LMR networks may be stored in the database 46 with the processor 44 configured to convert LMR content, for example, encoding schemes and encryption schemes of one LMR network to another LMR network based on the stored information for each of the LMR networks, communication groups and individual mobile/fixed units. For example, the transcoder 28 operates to decode and re-encode the LMR content based on the type of vocoder from which the LMR content was received and the type of vocoder to which the LMR content is to be transmitted. It should be noted that any of the information stored in the database 46 alternatively or additionally may be stored in local memory within the transcoder 28 and/or transcryptor 42. Additionally, different information may be stored, including, for example, preferred airlink modes, preferred vocoders, preferred encryption modes, encryption keys, etc. as described in more detail herein. Also, a routing function is performed by the routing module 50 wherein LMR content received from one domain (e.g., a dispatch console or an RF site) addressed to the transcoder 28 via the voice switch 40, and which is subsequently transcoded, is then transmitted to another domain (e.g., a collection of disparate RF sites). Essentially, the routing function receives IP packets, and after the transcoding/transcrypting has been performed, assembles new IP packets with a list of destination addresses, which are then transmitted to the destination addresses using known IP routing techniques.

It also should be noted that when reference is made herein to transcoding, this refers to the conversion of voice from one format to another. The conversion includes, but is not limited to, vocoder conversion and transcryption (encryption conversion).

Figure 3:
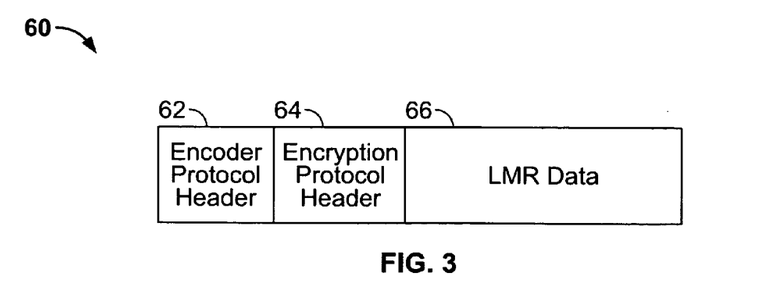
FIG. 3 is a block diagram illustrating a format for LMR content communicated in accordance with an exemplary embodiment of the invention.

The LMR content generally includes an LMR data portion and a header/encapsulation portion. The LMR content, for example, LMR voice packets may be formatted as shown in FIG. 3. In particular, the LMR content 60 may include an encoder protocol header 62, an encryption protocol header 64, and LMR data 66, for example, an LMR payload. The LMR content 60 is essentially digitally encoded and encrypted, for example, in an IP encoded/encrypted format such that the processor 44 may convert and/or translate from one encoding/encryption scheme to another so that the LMR content 60 may be transmitted from one LMR network to another LMR network, thereby allowing users with different vocoders to communicate with each other. Accordingly, the LMR content 60 is translated and/or converted in the digital domain instead of being subjected to devocoding and transmission in the analog domain.

Figure 4:
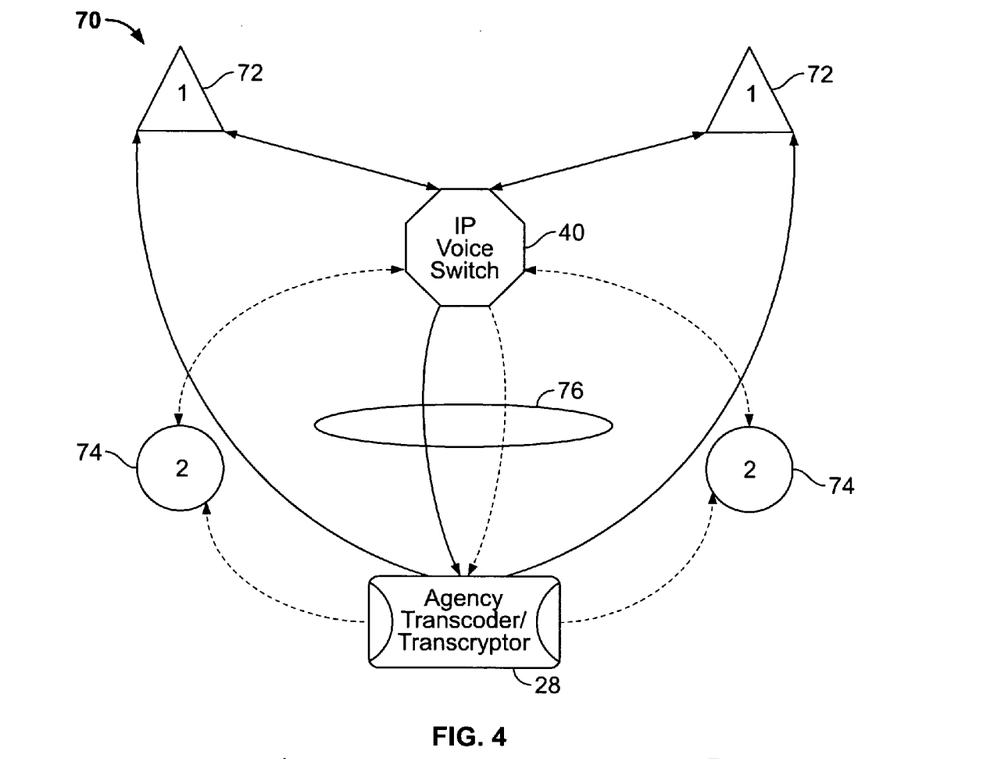
FIG. 4 is a block diagram of a transcoder configuration constructed in accordance with an exemplary embodiment of the invention.
Figure 5:
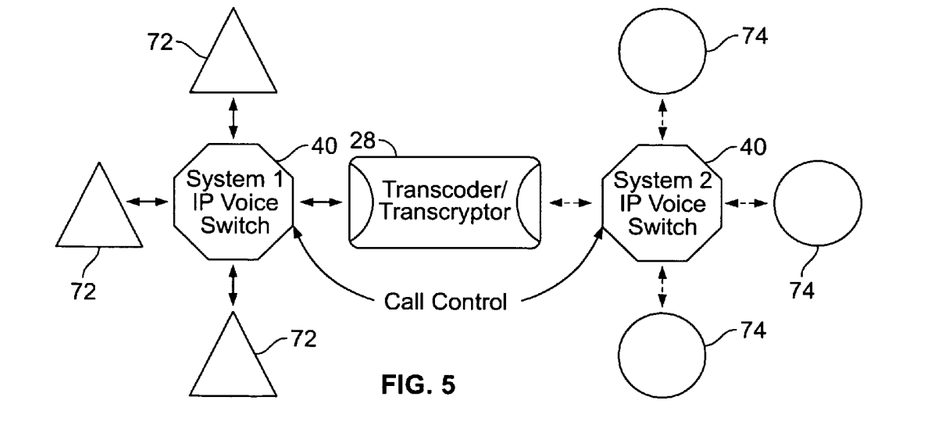
FIG. 5 is a block diagram of a transcoder configuration constructed in accordance with another exemplary embodiment of the invention.

The various embodiments may be provided in different configurations, for example, as shown in FIGS. 4 and 5. For example, an overlay configuration 70 is shown in FIG. 4 wherein different format RF sites are operating on the same IP voice switch 40. In this example, a first type of sites/base stations 72 communicate using RF signal configured using a first format (e.g., TETRA) and a second type of sites/base stations 74 communicate using a second format (e.g., APCO Project 25). In this embodiment, the transcoder 28 is separate from the IP voice switch 40. Communication of LMR packets (e.g., voice packets) using the first type of sites/base stations 72 is illustrated by the solid arrows and communication of LMR packets using the second type of sites/base stations 74 is illustrated by the dashed arrows. The communication may be, for example, communication of IP voice packets. In operation, the transcoder 28 translates (e.g., digitally converts) the packets, for example, a message 76 from a first LMR communication protocol (e.g., first encoding and encryption scheme) to a second LMR communication protocol corresponding to the first and second types of sites/base stations 72 and 74, respectively. Essentially, the transcoder 28 receives the message 76 with instructions or commands to translate the message 76 and forward the message 76 to a particular destination, for example, a base station in one of the two LMR systems. The transcoding may be performed in different manners as described herein to provide the translation from one LMR format to another LMR format.

In another configuration, as shown in FIG. 5, the different LMR formats are isolated in separate physical regions, for example, a first region 78 and a second region 80 with a separate IP voice switch 40 in each of the first and second regions 78 and 80. In this embodiment, the transcoder 28 is provided between the IP voice switches 40. It should be noted that the transcoder generally also includes the transcryptor 42 (shown in FIG. 2) and may be integrated therewith. In this embodiment, the two regions 78 and 80 may be, for example, two P25 systems, such as a Phase 1 FDMA system and a Phase 2 TDMA system, connected through an InterSwitching System Interface (ISSI), also referred to as a call control. This configuration operates similar to the configuration shown in FIG. 4. However, it should be noted that call control is handled separately from transcoding, for example, in any known manner.

It further should be noted that in the various embodiments, including the configurations shown in FIGS. 4 and 5, the IP voice switch 40 is configured to determine and identify LMR packets from different groups of users (e.g., interoperability groups) that are to be passed through and processed by the transcoder 28. Information to identify groups of users to be associated and communications from those groups may be stored in a mobility database, for example, the database 46 (shown in FIG. 2). Further, information for each of the groups of users may include a preferred format, thereby reducing or minimizing the number of sites/base stations that receive a transcoded message from a user in that group.

In operation, the various embodiments provide transcoding that essentially converts data from one vocoder format to another vocoder format without leaving the vocoder domain. For example, the transcoder 28 translates parameters such as pitch, gain, sub-bands, voiced/unvoiced decisions, etc. from one vocoder format to another vocoder format. Further, the transcryptor 42 operates to convert from one encryption scheme to another, for example, from DES to AES. Accordingly, the LMR content is decrypted and re-encrypted, which includes the use of encryption keys for the different vocoders or LMR networks. The various embodiments maintain this intermediate unencrypted copy of the LMR packet (e.g., copy of the voice transmission) in digital vocoder form. For example, the unencrypted LMR packet may be briefly stored within the volatile memory of a digital signal processor or processor before final re-encryption within the transcoder 28 with the transcoder 28 physically secured and programmed to perform specific functions for specific groups and users.

Figure 6:
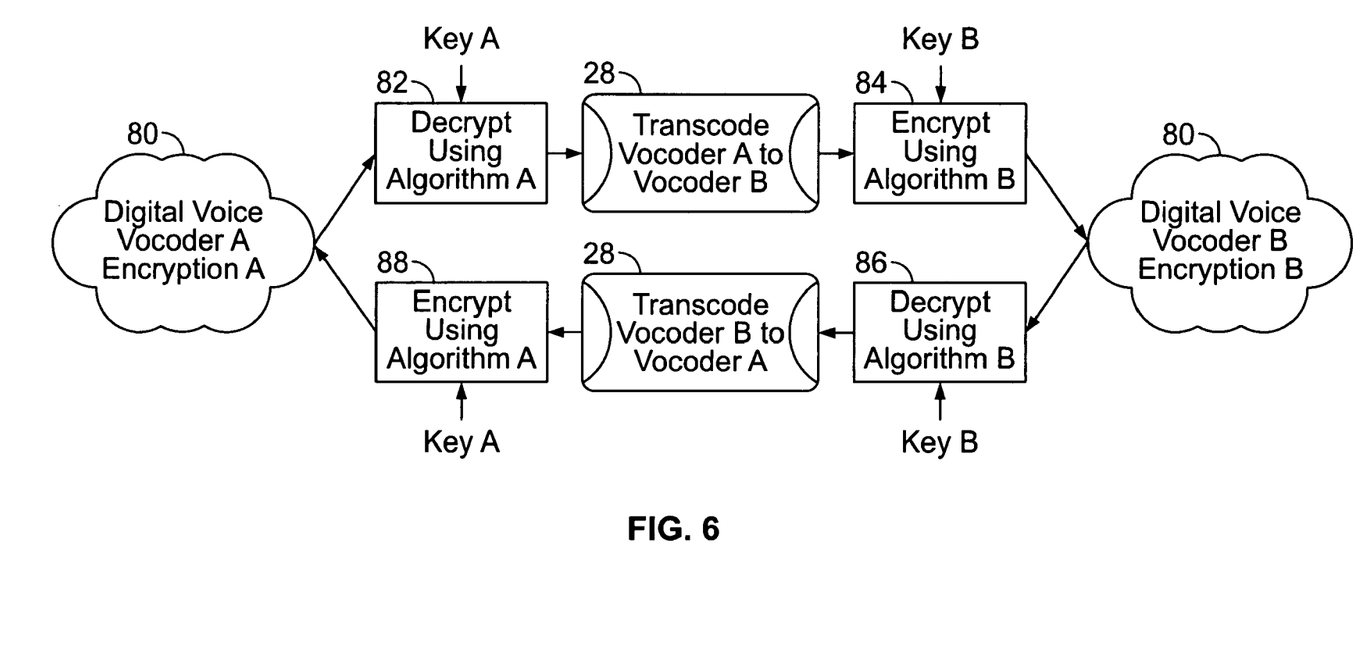
FIG. 6 is a block diagram illustrating transcoding and transcrypting in accordance with an exemplary embodiment of the invention.

It should be noted that the transcoding and transcrypting may be performed in any known manner. As illustrated in FIG. 6, content, for example, digital voice transmissions 80 from a first LMR unit using a first type of vocoder (Vocoder A) and a first type of encryption (Encryption A) are decrypted by a decryption algorithm 82 (Algorithm A) using a decryption key (Key A) in any known manner. If the digital voice transmission is to be transmitted to a second LMR unit using a second type of vocoder (Vocoder B) and a second type of encryption (Encryption B), then the transcoder 28 translates the digital voice transmission from a Vocoder A format to a Vocoder B format. The translated digital voice transmission is then encrypted by an encryption algorithm 84 (Algorithm B) using an encryption key (Key B) in any known manner. The digital voice transmission 80 can then be received by the second LMR unit and, for example, output as audio to a user.

Similarly, digital voice transmissions 80 from the second LMR unit are decrypted by a decryption algorithm 86 (Algorithm B) using a decryption key (Key B) in any known manner. If the digital voice transmission is to be transmitted to the first LMR unit, then the transcoder 28 translates the digital voice transmission from a Vocoder B format to a Vocoder A format. The translated digital voice transmission is then encrypted by an encryption algorithm 88 (Algorithm A) using an encryption key (Key A) in any known manner. The digital voice transmission 80 can then be received by the first LMR unit and, for example, output as audio to a user.

Accordingly, communications, for example, IP voice packets transmitted and received by RF base stations within an LMR network are communicated in the native network and over-the-air formats. Encryption keys are thereby contained in secured areas, for example, within the transcryptor 42, which may be provided as part of the transcoder 28.

Figure 7:
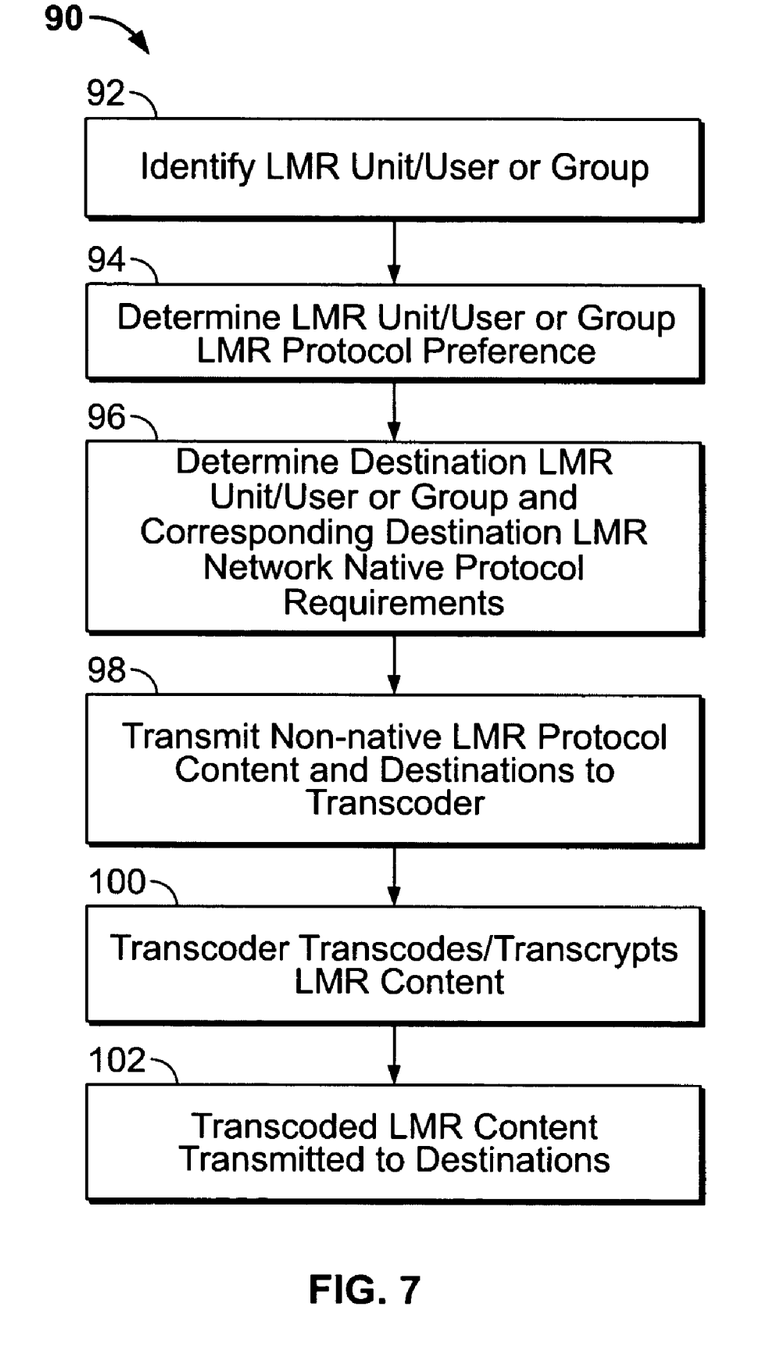
FIG. 7 is a flowchart illustrating a method for providing transcoding in accordance with an exemplary embodiment of the invention.

Various embodiments of the invention allow communication between LMR units having different communication requirements and for communication in different LMR networks. A method 90 for providing transcoding is shown in FIG. 7. The method 90 will be described in connection with a multisite LMR system wherein a P25 FDMA system is overlaid with an OPENSKY® TDMA system. In this LMR system, P25 FDMA RF sites (e.g., base stations) and OPENSKY® TDMA RF sites are connected through an IP voice switch, for example, a Voice Network Controller available from M/A-COM, Inc., a unit of Tyco Electronics. The LMR system includes a mix of P25 radio users and OPENSKY® radio users. For example, the OPENSKY® radio users may be located in a metropolitan area where TDMA is used for capacity and high data rates, with the P25 users located in the outlying rural areas where FDMA is used for extended coverage.

Referring to the method 90, at 92 an LMR unit and/or user or group attempting to communicate with another LMR unit is identified. For example, a P25 mobile radio user such as a police person, fire person, EMS person, etc. attempts to make an encrypted digital voice group call and selects a desired group in any known manner using the LMR unit (e.g., selecting from a group list on a screen of the LMR unit). At this point the LMR unit, for example, the mobile radio is registered on a P25 trunked RF site. Thereafter at 94 a determination is made as to any communication preferences (e.g., LMR protocol preference) for the user or group. For example, the user or group may have a preferred vocoder or a preferred airlink. Optionally, secondary, tertiary, etc. vocoders and airlinks also may be determined. Continuing with the example, the user/unit may have as a preferred vocoder a P25 Full Rate Vocoder and have as a preferred airlink a P25 Phase 1 FDMA airlink. The determination at 94 may include determining group preferences and/or whether the group in which the user is registered is also registered as a special interoperability group. For example, the special interoperability group may be identified in the network database as being a mixed group (versus an FDMA-only group or TDMA-only group) also having a preferred vocoder and a preferred airlink such as a Full Rate IMBE vocoder and a P25 Phase 1 FDMA airlink.

Thereafter at 96 a determination is made as to the destination LMR unit/user or group for the LMR transmission and the corresponding LMR network or unit communication requirements, and in particular, the corresponding destination LMR network native protocol requirements. For example, a user may press and hold a push-to-talk (PTT) button on a mobile LMR radio. The call then proceeds in a known manner, for example, as a normal P25 trunked digital voice group call on the site/base station. The base station converts the air interface voice data units to IP voice packets for transport (e.g., communication) through the network. At this point, the IP voice switch in the network is notified of the group call and prepares to receive and forward the voice packets to other destinations (e.g., other RF sites, based stations, dispatch consoles, etc.) as is known and using any known manner. The IP voice switch determines where the destination group is active, for example, from a mobility database as is known and sets up a call with all the other destinations in any known manner. The IP voice switch, which may include the transcoder processes the communication to identify a Group ID and in this example determines that some of the destination are non-native P25/FDMA sites/regions.

Thereafter, at 98, the LMR content, for example, IP voice packets identified by the IP voice switch as packets to be transmitted to destination sites/regions that support a different airlink, are routed through the transcoder for conversion. For example, non-native LMR protocol content and destination addresses are transmitted to the transcoder. It should be noted that the IP voice switch creates a list of destination RF sites, regions, consoles, etc. The list contains all of the IP addresses of the native mode RF site channels and regions, the IP address of the transcoder (and/or transcryptor) and a sublist of the IP addresses of forwarding destinations for the transcoded LMR content. It should be noted that the transcoder may be configured to process communications from multiple groups and/or agencies, multiple transcoders may be provided (one for each group transmission), or both. Thus, the IP voice switch can determine where to transmit the LMR content (e.g., voice) based on, for example, the Group ID.

The various embodiments may have the component parts provided at different locations. For example, in an exemplary embodiment, the LMR content, such as voice packets, are routed to dispatch consoles in native (originated) formats with the dispatch consoles each having all the various vocoder and encryption algorithms and keys required to communicate with different groups/users. However, it should be noted that alternatively the dispatch consoles may each support only one LMR format. Further, in the various embodiments, voice calls made from a dispatch console are originated in the preferred vocoder and preferred airlink modes as identified by the network database. It should be noted that the transcoder may be loaded with the encryption keys in a secure manner separate from, for example, a network management/administration server.

It further should be noted that the IP voice switch receives, for example, each voice packet and forwards the voice packets to the various destinations including to the transcoder. When LMR content, such as voice packets, are communicated to the transcoder at 98, in an exemplary embodiment, the message transmitted to the transcoder includes the following information: $(x, y, s_1 \ldots s_N)$, indicating and instructing the transcoder to translate the LMR content from a type x format to a type y format, and forward the packets to destinations $s_1 \ldots s_N$. Continuing with the example, the information communicated to the transcoder may be as follows:

1. x=P25 Full-Rate Vocoder, Key ID, Algorithm ID
2. y=OPENSKY® AMBE Vocoder, Key ID, Algorithm ID
3. $s_N$=information regarding the destination including, for example, the device type, IP address, call control parameters, etc.

It should be noted that the IP address may be a multicast address.

Thereafter, at 100, the LMR content, for example, voice packets received by the transcoder are transcoded and transcrypted as described in more detail herein, for example, as shown in FIG. 6. The transcoding includes direct digital to digital conversion or translation without devocoding. The transcoder essentially operates as an interface between two LMR networks or systems that have different communications standards or protocols. The transcoding and transcryption changes the structure of the LMR content, for example, the LMR voice packet. In particular, speech vectors (e.g., pitch, gain sub-bands, voiced/unvoiced decisions, etc.) from one vocoder type are translated into speech vectors for another vocoder type. This may include mapping the speech vectors between the two vocoder types using stored information regarding the configuration, requirements, etc. of each of the speech vectors for the different vocoder formats. This translation may include changing the number of bits that represent the particular speech vector, retiming or resynchronizing the data, etc. The mapping information may be stored in a table, such as in a matrix format, wherein for each vocoder type, the details for each of the speech vectors is identified. Further, the operations to be performed to translate each speech vector between vocoder types also may be identified. Essentially, the mapping function translates the LMR content such that the speech parameters defined by the speech vectors may be used to reconstructed the LMR content that is communicated from one vocoder type to another vocoder type. This translation may be performed using known vocoder operations for each of the different vocoder types between which the LMR content is to be translated.

Further, the transcryptor operates to convert from one encryption scheme to another, for example, from DES to AES in any known manner. This may be performed using any known encryption and decryption schemes. Accordingly, the format of the LMR content is converted and also decrypted and re-encrypted, which includes the use of encryption keys for the different vocoders or LMR networks.

The transcoded and transcrypted LMR content (e.g., converted data packets) is then transmitted (e.g. forwarded) to the destination IP addresses by the transcoder at 102. Alternatively, the transcoded and transcrypted LMR content is transmitted to the IP voice switch for distribution. It should be noted that as RF sites, consoles, etc. enter or leave an in-progress call, the IP voice switch updates a routing table and the sublist for the transcoder, if needed.

Using the various embodiments provides for communicating LMR content within an LMR system or between LMR systems that have different encoding types (which may also include different encryption types). For example, two different vocoder types in different LMR systems may communicate IP packets structured in different configurations. This may include, for example, in one network forming a voice packet that contains 60 milliseconds (ms) of speech or voice content corresponding to three 20 ms voice frames when using an IMBE or AMBE vocoder. The voice packets contain the vocoder parameters, and in particular, speech vectors, for the voice segments and corresponding to the vocoder type. This information, is the same information that is communicated over the air in the communication protocol (e.g., P25, OPENSKY®, etc.), but imbedded in an IP packet. Assume that a communication is provided via a P25 RF site, for example, the voice packets include IP/UDP headers, a voice packet header (that identifies a group identification (Group ID), packet sequence numbers and other call control information), vocoder parameters and encryption parameters (e.g., algorithm ID identifying the type of encryption algorithm, algorithm key ID and current cryptosync information), among other information. This information is then remapped as described herein such that the output of the transcoder 28 is an equivalent voice packet formatted for the destination RF site using the vocoder and encryption scheme for that site (e.g., different vocoder parameters, different algorithm ID, different key ID, etc.).

The transcoding algorithms may be based on mapping information as described herein. For transcoding that occurs between two vocoders from the same family, for example, Full Rate IMBE and Half-Rate AMBE, known algorithms may be implemented, for example, as available from Digital Voice Systems, Inc. of Westford, Mass. In other embodiments, the transcoding may include decoding the LMR content to the digital PCM signal using one vocoder processing scheme and then re-encoding the PCM digital using another vocoder processing scheme. The vocoder processing schemes are the operations performed by the vocoder when encoding LMR content, such as voice transmission, within the LMR system for that vocoder type.

However, it should be noted that the transcoding may include more than translating the encoding and decrypting/re-encrypting. For example, an EDACS voice packet includes 80 ms of speech instead of 60 ms of speech. Accordingly, the transcoder 28, in addition to converting the LMR content (e.g., voice), buffers and retimes the data such that a steady stream of voice is maintained from a 60 ms based site interface protocol to an 80 ms based protocol. This may be provided using any known timing scheme, for example, using a synchronizing clock, etc. Further, the transcoder 28 also determines whether voice packets are late or missing, for example, based on the header information, such as a time stamp. Such delayed or missing data is compensated for by realigning the received LMR content. Again, any synchronizing process, for example, wireless communication synchronizing scheme may be used.

The various embodiments may be implemented in connection with different types of LMR systems and for communicating different types of LMR content and are not limited to the examples herein. In general, the various embodiments provide transcoding of LMR content from one vocoder format to another vocoder format in the vocoder domain. This transcoding allows for end-to-end encryption within the LMR system.

The various embodiments or components, for example, the LMR system, transcoder and components or controller therein may be implemented using one or more computer systems. For example, the various embodiments may include a computer system that may include a computer, an input device, a display unit and an interface. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A land mobile radio (LMR) system comprising:
   a first communication site configured to communicate using a first LMR communication protocol;
   a second communication site configured to communicate using a second LMR communication protocol, the first LMR communication protocol and second LMR communication protocol based on different vocoder formats; and a transcoder configured to:
receive LMR content from the first communication site communicated using the first LMR communication protocol, said LMR content generated by a first LMR unit;
identify a group to which said first LMR unit belongs, said group being a special interoperability group comprising a plurality of LMR units each employing a plurality of different vocoder types;
identify which of said plurality of different vocoder types is preferred by said special interoperability group;
digitally convert the LMR content directly to the second LMR communication protocol to be communicated to the second communication site by directly mapping a plurality of vocoder speech vectors from a first vocoder type to said preferred one of said different vocoder types exclusive of any devocoding;
buffer and re-time the LMR content contained within a plurality of voice packets to provide a steady stream of said LMR content output from said transcoder; and
determine whether said LMR content is late or missing, and realign the LMR content to compensate for said LMR content that is late or missing.

2. An LMR system in accordance with claim 1 further comprising at least one voice switch configured to communicate LMR content to be digitally converted to the transcoder.

3. An LMR system in accordance with claim 2 wherein the voice switch determines at least one of a preferred vocoder and a preferred airlink to identify LMR content to be digitally converted and communicated to the transcoder.

4. An LMR system in accordance with claim 1 wherein the first and second communication protocols comprise at least one of a voice encoding scheme and an encryption scheme.

5. An LMR system in accordance with claim 1 wherein the first communication site is configured to communicate using a first encryption scheme and the second communication site is configured to communicate using a second encryption scheme and further comprising a transcryptor configured to convert between the first and second encryption schemes when communicating LMR content from the first communication site to the second communication site.

6. An LMR system in accordance with claim 1 wherein the first communication site is configured to communicate using said first vocoder type and the second communication site is configured to communicate using said second vocoder type and wherein the transcoder translates between the first and second vocoder types when communicating LMR content from the first communication site to the second communication site.

7. An LMR system in accordance with claim 1 further comprising a database including a listing of a plurality of users and groups of users registered to communicate via at least one of the first communication site and the second communication site.

8. An LMR system in accordance with claim 1 further comprising a database including at least one of a preferred airlink mode, a preferred vocoder type and a preferred encryption mode of at least one of a plurality of mobile LMR units for at least one of a plurality of groups of users configured to communicate via at least one of the first communication site and the second communication site.

9. An LMR system in accordance with claim 1 further comprising a dispatch console configured to communicate with each of the first communication site and the second communication site, and wherein encoder and encryption information for each of a plurality of users or groups of users is stored within the dispatch console.

10. An LMR system in accordance with claim 1 wherein the transcoder is further configured to store voice encoder requirements and encryption algorithm requirements for each of the first and second communication sites.

11. An LMR system in accordance with claim 1 wherein the transcoder is further configured to store a plurality of encryption keys corresponding to a user or group of users.

12. A land mobile radio (LMR) system comprising:
a plurality of LMR units, at least first and second LMR units of the plurality of LMR units employ a plurality of different voice encoders; and
a transcoder configured to:
receive LMR content from a first communication site communicated using a first LMR communication protocol, said LMR content generated by said first LMR unit;
identify a group to which said first LMR unit belongs, said group being a special interoperability group comprising a plurality of LMR units, each employing a plurality of different vocoder types;
identify which of said plurality of different vocoder types is preferred by said special interoperability group;
digitally convert said LMR content directly to a second communication protocol to be communicated to said second LMR unit of a second communication site by directly mapping a plurality of vocoder speech vectors from a first vocoder type to said preferred one of said different vocoder types exclusive of any devocoding;
buffer and re-time the LMR content contained within a plurality of voice packets to provide a steady stream of said LMR content output from said transcoder; and
determine whether said LMR content is late or missing, and realign the LMR content to compensate for said LMR content that is late or missing.

13. An LMR system in accordance with claim 12 wherein said first and second LMR units are configured to operate using different encryption schemes, and
said LMR system further comprises a transcryptor configured to digitally encrypt and decrypt LMR content communicated between said first and second LMR units operating using the different encryption schemes.

14. An LMR system in accordance with claim 12 further comprising a database storing a list of users or groups of users corresponding to the plurality of LMR units.

15. An LMR system in accordance with claim 14 wherein the database further stores at least one of a preferred airlink mode, a preferred voice encoder and a preferred encryption scheme for at least one of the users and the groups of users.

16. An LMR system in accordance with claim 12 further comprising a voice switch configured to identify LMR content to be digitally converted and to communicate the identified content to the transcoder.

17. A method for communicating content in a land mobile radio (LMR) system, the method comprising:
receiving LMR content from a first communication site using a first LMR protocol, said LMR content generated by a first LMR unit;
identifying a group to which said first LMR unit belongs, said group being a special interoperability group comprising a plurality of LMR units each employing a plurality of different vocoder types;
identifying which of said plurality of different vocoder types is preferred by said special interoperability group;

converting digitally the LMR content directly to a second LMR communication protocol to be communicated to a second communication site by directly mapping a plurality of transcoder speech vectors from a first vocoder type to said preferred one of said different vocoder types exclusive of any devocoding;

buffering and re-timing the LMR content contained within a plurality of voice packets to provide a steady stream of said LMR content which has been converted; and determining whether said LMR content is late or missing, and realigning the LMR content to compensate for said LMR content that is late or missing.

18. A method in accordance with claim 17 further comprising determining whether the LMR content communicated between LMR units includes non-native LMR content and converting the non-native LMR content.

19. A method in accordance with claim 18 further comprising decrypting and re-encrypting the non-native LMR content to be communicated between different communication sites using encryption keys corresponding to each of the different communication sites.

20. A method in accordance with claim 18 wherein the converting comprises digitally decoding and re-encoding the non-native LMR content using two different encoding schemes.

21. A method in accordance with claim 18 further comprising determining at least one of a preferred airlink type, a preferred voice encoder type and a preferred encryption scheme for the non-native LMR content based on the LMR user communicating the LMR content.

* * * * *